(12) United States Patent
Kawahara et al.

(10) Patent No.: US 8,805,752 B2
(45) Date of Patent: Aug. 12, 2014

(54) LEARNING DEVICE, LEARNING METHOD, AND COMPUTER PROGRAM PRODUCT

(75) Inventors: Tomokazu Kawahara, Kanagawa (JP); Tatsuo Kozakaya, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 337 days.

(21) Appl. No.: 13/412,688

(22) Filed: Mar. 6, 2012

(65) Prior Publication Data

US 2012/0246099 A1    Sep. 27, 2012

(30) Foreign Application Priority Data

Mar. 23, 2011    (JP) .................. 2011-064354

(51) Int. Cl.
*G06F 15/18*    (2006.01)
(52) U.S. Cl.
USPC ........................................................... 706/12
(58) Field of Classification Search
None
See application file for complete search history.

(56) References Cited

U.S. PATENT DOCUMENTS

| 7,792,353 | B2 * | 9/2010 | Forman et al. ................. 382/159 |
| 2008/0071711 | A1 * | 3/2008 | Zhang et al. ..................... 706/20 |
| 2012/0052473 | A1 | 3/2012 | Kozakaya |
| 2012/0243779 | A1 | 9/2012 | Nakai et al. |

FOREIGN PATENT DOCUMENTS

| JP | 2006-268825 | 10/2006 |
| JP | 2012-128558 | 7/2012 |

OTHER PUBLICATIONS

Learning and Evaluating Classifiers under Sample Selection Bias Bianca Zadrozny zadrozny@us.ibm.com Appearing in Proceedings of the 21 st International Conference on Machine Learning, Banff, Canada, 2004. Copyright 2004 by c IBM Corporation.*
Kumar, Neeraj, et al.; "Attribute and Simile Classifiers for Face Verification", IEEE 12th International Conference on Computer Vision (ICCV), 2009, pp. 365-372.

* cited by examiner

*Primary Examiner* — Kakali Chaki
*Assistant Examiner* — Luis Sitiriche
(74) *Attorney, Agent, or Firm* — Amin, Turocy & Watson, LLP

(57) ABSTRACT

According to an embodiment, a learning device includes a selecting unit, a learning unit, and an evaluating unit. The selecting unit performs a plurality of selection processes of selecting a plurality of groups including one or more learning samples from a learning sample storage unit, where respective learning samples are classified into any one of a plurality of categories. The learning unit learns a classification metric and obtains a set of a classification metric. The evaluating unit acquires two or more evaluation samples of different categories from an evaluation sample storage unit where respective evaluation samples are classified into any one of a plurality of categories; evaluates the classification metric included in the set of the classification metric using the two or more acquired evaluation samples; acquires a plurality of classification metric corresponding to the evaluation results from the set of the classification metric; and thereby generates an evaluation metric including the plurality of classification metric.

12 Claims, 11 Drawing Sheets

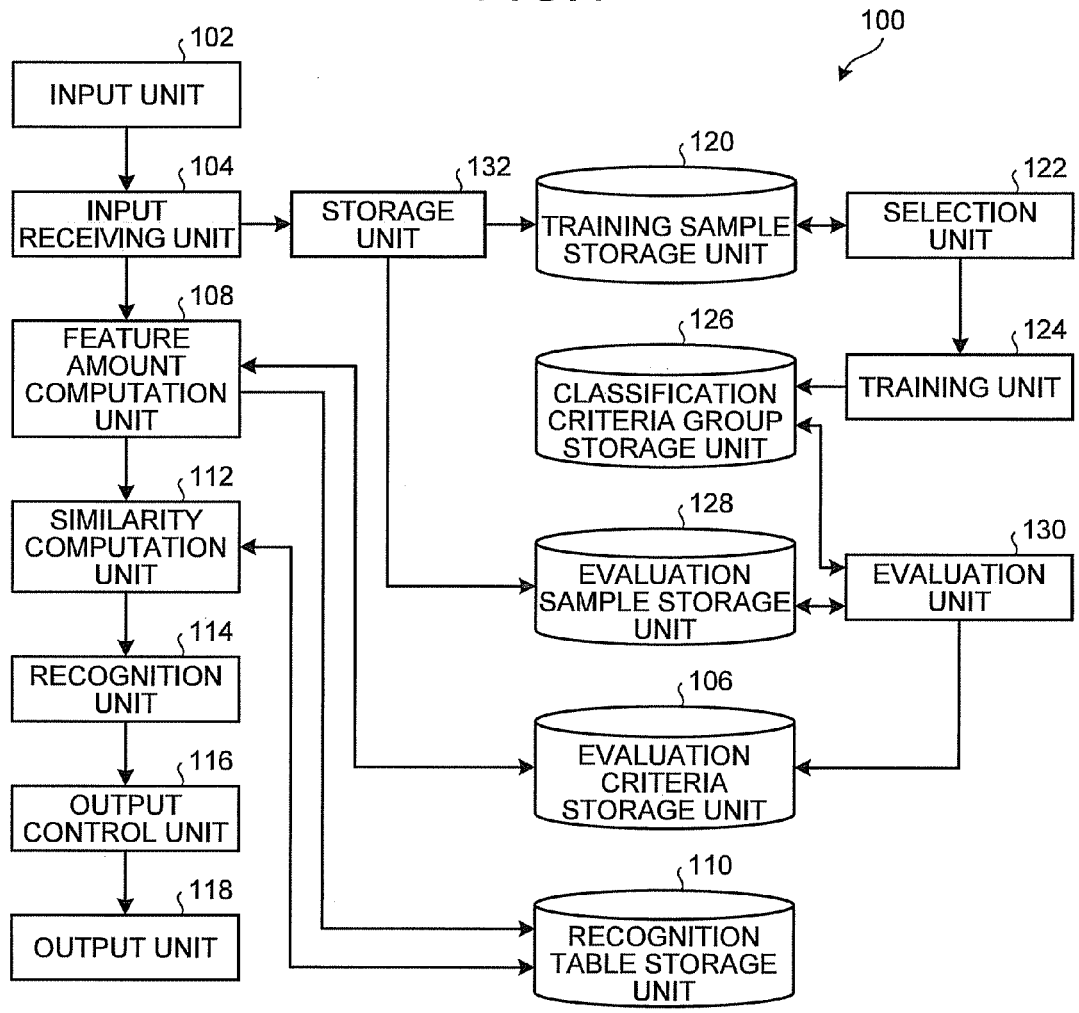

| CATEGORY | FIDUCIAL FEATURE AMOUNT |
|---|---|
| A | $v'(A)=(a_1, a_2 \cdots, a_O)$ |
| B | $v'(B)=(b_1, b_2 \cdots, b_O)$ |

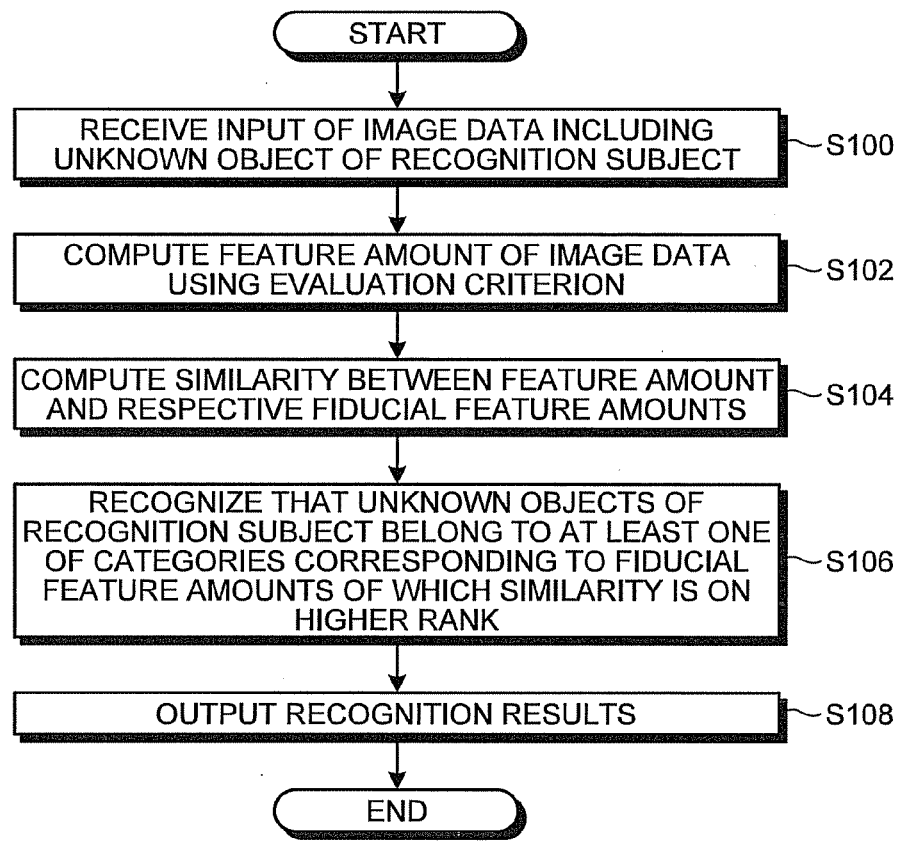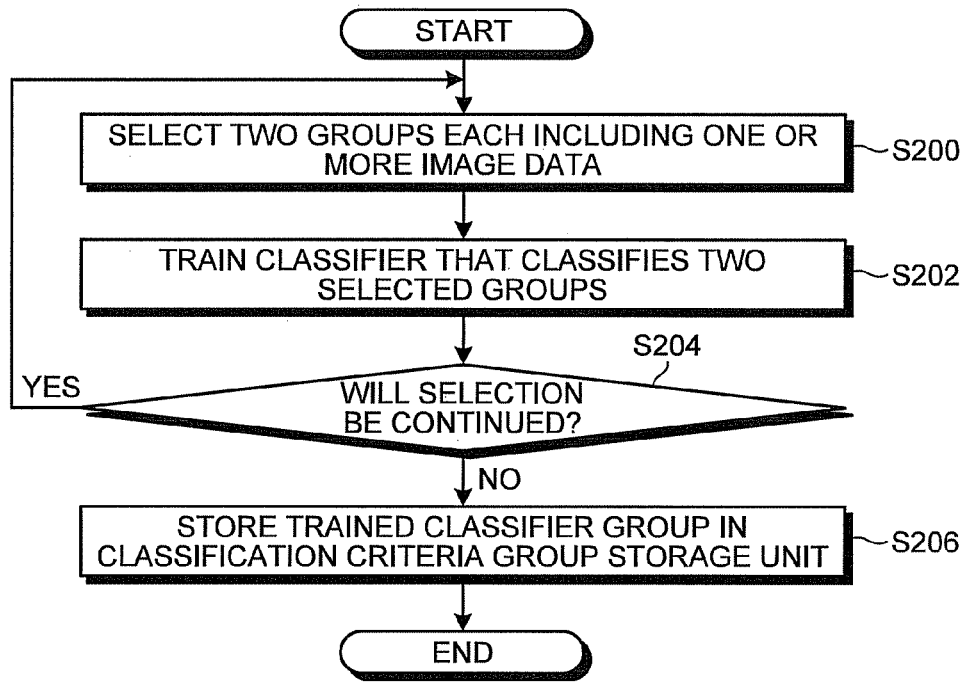

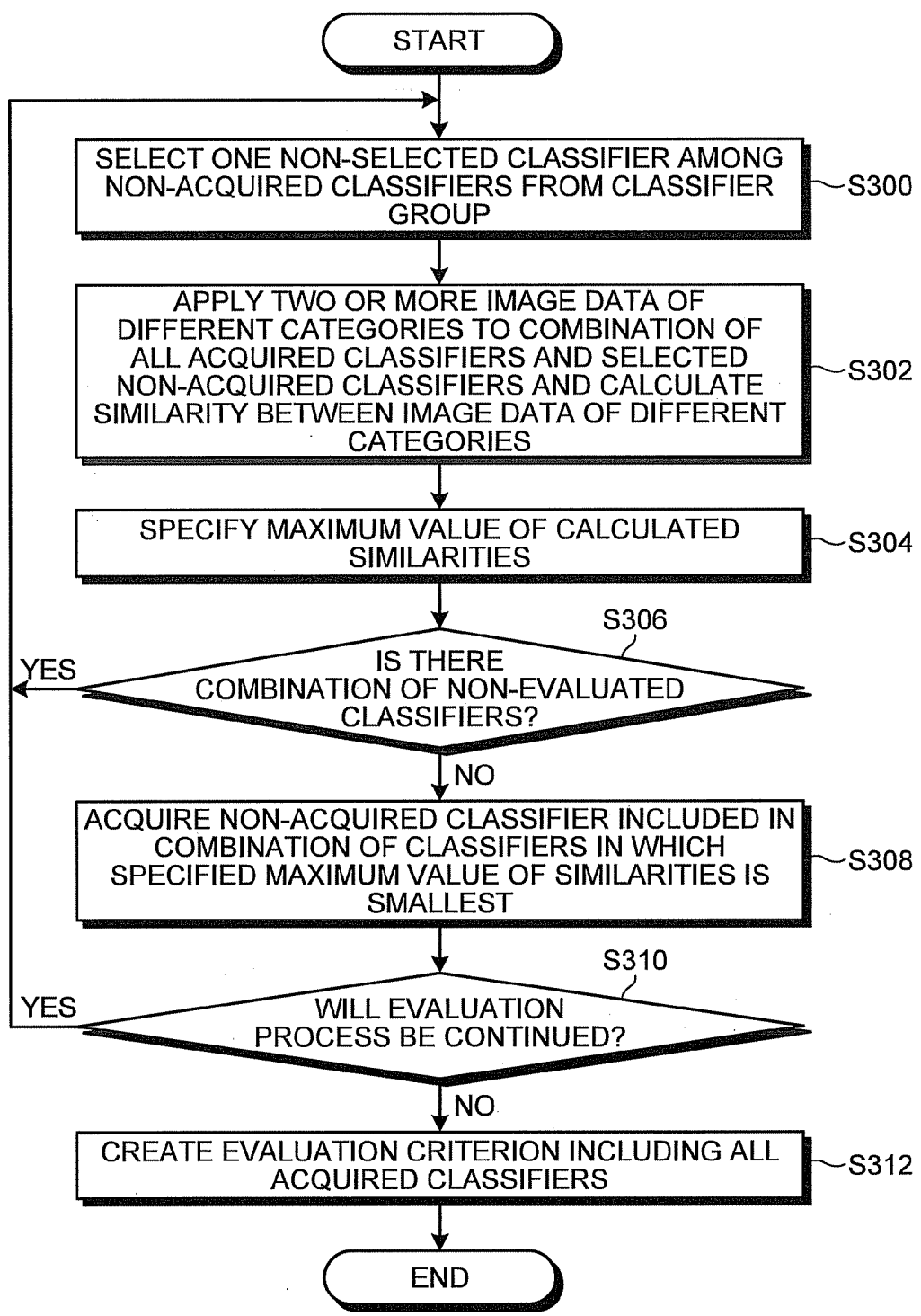

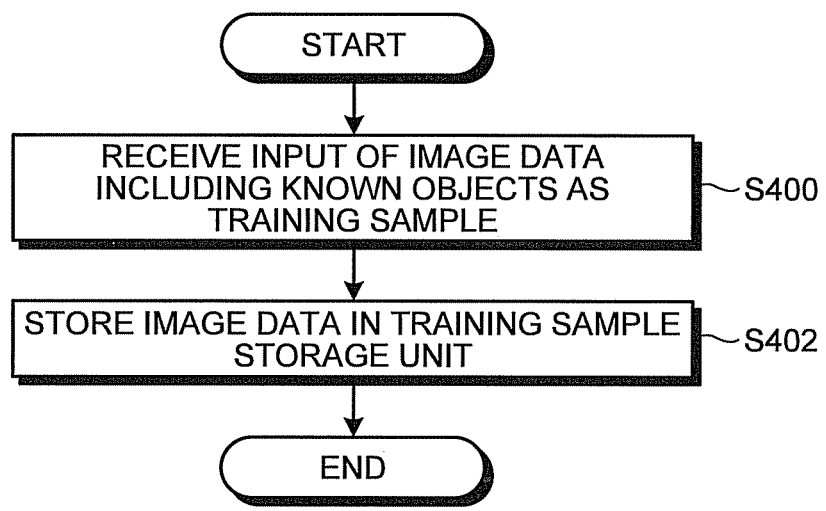
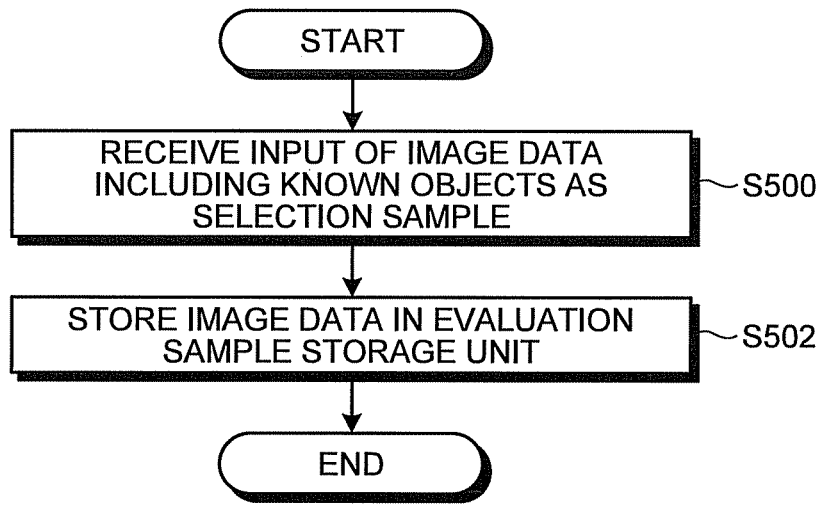

LEARNING DEVICE, LEARNING METHOD, AND COMPUTER PROGRAM PRODUCT

CROSS-REFERENCE TO RELATED APPLICATIONS

This application is based upon and claims the benefit of priority from Japanese Patent Application No. 2011-064354, filed on Mar. 23, 2011; the entire contents of which are incorporated herein by reference.

FIELD

Embodiments described herein relate generally to learning device, learning method, and computer program product for learning method.

BACKGROUND

In recent years, in classifier learning methods, a learning method is proposed in which persons gives respective learning samples in learning data in advance with attributes corresponding to the learning sample to thereby learn a two-class classifier which is a classification metric for classifying given attributes. Examples of the attribute given to learning samples include gender and the like if the learning samples are the images of person's face.

In the learning method, respective learning samples are given with various attributes in advance to thereby learn a two-class classifier of each of the given attributes. Moreover, a plurality of learned two-class classifiers are used for object recognition or the like, with the output values of the respective two-class classifiers being used as feature amounts of objects.

However, in the technique of the related art, persons have to give the learning samples with attributes, which incurs a cost.

BRIEF DESCRIPTION OF THE DRAWINGS

FIG. 1 is a block diagram illustrating a configuration example of a learning device according to a first embodiment;

FIG. 2 is a diagram illustrating an example of a method of calculating a feature amount of image data in the first embodiment;

FIG. 5 is a flowchart illustrating an example of a recognition process in the first embodiment;

FIG. 6 is a flowchart illustrating an example of a learning process in the first embodiment;

FIG. 7 is a flowchart illustrating an example of an evaluation process in the first embodiment;

FIG. 8 is a flowchart illustrating an example of a learning sample storing process in the first embodiment;

FIG. 9 is a flowchart illustrating an example of an evaluation sample storing process in the first embodiment;

DETAILED DESCRIPTION

Figures 3, 4:
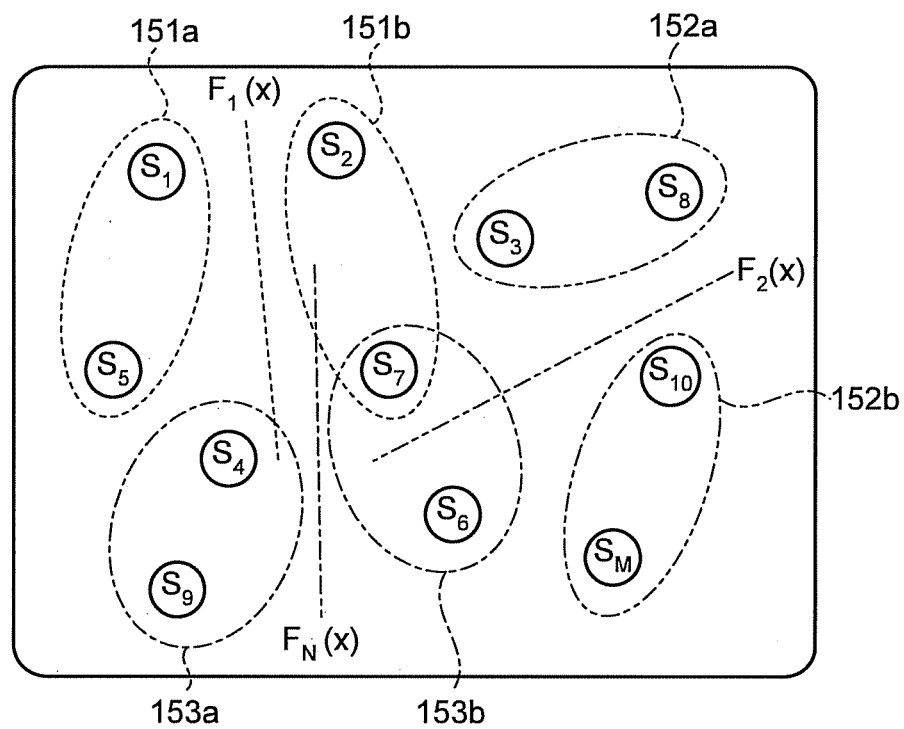
FIG. 3 is a diagram illustrating an example of a recognition table in the first embodiment.
FIG. 4 is a diagram illustrating an example of a method of generating a classifier group in the first embodiment.

According to an embodiment, a learning device includes a selecting unit, a learning unit, and an evaluating unit. The selecting unit is configured to perform a plurality of selection processes of selecting a plurality of groups including one or more learning samples from a learning sample storage unit that stores a plurality of learning samples in which respective learning samples are classified into any one of a plurality of categories. The learning unit is configured to learn a classification metric that classifies the plurality of groups for each of the plurality of selected groups and obtains a set of a classification metric. The evaluating unit is configured to acquire two or more evaluation samples of different categories from an evaluation sample storage unit that stores a plurality of evaluation samples in which respective evaluation samples are classified into any one of a plurality of categories, evaluate the classification metric included in the set of the classification metric using the two or more acquired evaluation samples, acquire a plurality of classification metric corresponding to the evaluation results from the set of the classification metric, and thereby generate an evaluation metric including the plurality of classification metric.

Various embodiments will be described hereinafter with reference to the accompanying drawings.

First Embodiment

FIG. 1 is a block diagram illustrating an example of the configuration of a learning device 100 according to the first embodiment. As shown in FIG. 1, the learning device 100 includes an input unit 102, an input receiving unit 104, an evaluation metric storage unit 106, a feature amount calculating unit 108, a recognition table storage unit 110, a similarity calculating unit 112, a recognition unit 114, an output control unit 116, an output unit 118, a learning sample storage unit 120, a selecting unit 122, a learning unit 124, a classification metric group storage unit 126, an evaluation sample storage unit 128, an evaluating unit 130, and a storage unit 132.

The input unit 102 can be realized by various input interfaces such as an image input interface, or the like. Moreover, the input receiving unit 104, the feature amount calculating unit 108, the similarity calculating unit 112, the recognition unit 114, the output control unit 116, the selecting unit 122, the learning unit 124, the evaluating unit 130, and the storage unit 132 can be realized by a conventional control device such as a central processing unit (CPU), or the like. Moreover, the evaluation metric storage unit 106, the recognition table storage unit 110, the learning sample storage unit 120, the classification metric group storage unit 126, and the evaluation sample storage unit 128 can be realized by at least one of conventional magnetic, optical, or electrical storage devices such as a hard disk drive (HDD), a solid state drive (SSD), a memory card, or a random access memory (RAM). Moreover, the output unit 118 can be realized by various output devices such as a liquid crystal display, or the like.

The input unit 102 inputs patterns including the target of a recognition subject. In the present embodiment, although an example in which the input unit 102 inputs image data including the object of a recognition subject is described as the patterns including the target of the recognition subject, the present embodiment is not limited to this. The patterns including the target of the recognition subject may be voice signals or the like including the voice of a recognition subject, for example.

In the present embodiment, although a case, in which the image data input by the input unit 102 is expressed by a vector of the dimensionality of Ds (Ds≥1) whose respective vector elements are brightness values, is described as an example, the embodiment may not be limited to this. In the present embodiment, it is assumed that the image data X input by the input unit 102 is expressed by $(X_1, X_2, \ldots, X_{Ds})$.

The input unit 102 may input image data which has been subjected to processes for making objects easy to be recognized, such as filtering, removal of background, or normalization of object positions. That is, the input unit 102 may input patterns which have been subjected to processes for making targets easy to be identified. For example, when the patterns are voice signals, the input unit 102 may input voice signals which have been subjected to processes such as filtering or the like.

Moreover, in the present embodiment, the input unit 102 also inputs learning samples and evaluation samples which will be described later.

The input receiving unit 104 receives the input of the patterns input from the input unit 102. In the present embodiment, the input receiving unit 104 receives the input of the image data X to which the object of the recognition subject is included, from the input unit 102. Moreover, in the present embodiment, the input receiving unit 104 also receives the input of learning samples and evaluation samples from the input unit 102.

The evaluation metric storage unit 106 stores an evaluation metric including a plurality of classification metric. In the present embodiment, the evaluation metric storage unit 106 stores evaluation metric $\{F_1(x), F_2(x), \ldots, F_O(x)\}$ including classifiers $F_j(x)$ (1≤j≤O (O≥2)).

The feature amount calculating unit 108 calculates the feature amount of the patterns received by the input receiving unit 104 using the evaluation metric stored in the evaluation metric storage unit 106. In the present embodiment, the feature amount calculating unit 108 calculates the feature amount of the image data X received by the input receiving unit 104 using the evaluation metric $\{F_1(x), F_2(x), \ldots, F_O(x)\}$ stored in the evaluation metric storage unit 106.

In the present embodiment, it is assumed that the respective classifiers $F_j(x)$ included in the evaluation metric $\{F_1(x), F_2(x), \ldots, F_O(x)\}$ return scores $s_j$ (evaluation values) for the image data X as shown in Expression (1) below. The scores $s_j$ correspond to the likelihood which represents whether the image data X belongs to any of the groups (classes) on which the classifiers have been learned in advance, the class number, and the like. As above, since the scores $s_j$ which are the output values of the classifiers $F_j(x)$ are represented by the likelihood or the like to belong to the group of classification subjects, Expression (1) is satisfied even when the classifiers $F_j(x)$ are learned by the learning unit 124 described later using any learning technique.

$$F_j(X) = s_j \qquad (1)$$

In the present embodiment, although a case where the scores $s_j$ are scalar quantities is described as an example, the scores $s_j$ are not limited to this but may be vectors having a plurality of elements, for example. Moreover, the following description can be similarly applied to when the scores $s_j$ are vectors. For example, when the classifiers $F_j(x)$ are learned by the learning unit 124 described later using a learning technique that classifies three or more groups, the classifiers $F_j(x)$ output vectors of which the elements are composed of the likelihood to belong to respective categories included in the classification subject group.

FIG. 2 is a diagram illustrating an example of a method of calculating the feature amount v(X) of the image data X. As shown in FIG. 2, the feature amount calculating unit 108 applies the image data X received by the input receiving unit 104 to the evaluation metric $\{F_1(x), F_2(x), \ldots, F_O(x)\}$ stored in the evaluation metric storage unit 106 to acquire the scores $s_j$ from the respective classifiers $F_j(x)$ and calculates the feature amount v(X) of the image data X from the acquired scores $s_j$. In the present embodiment, the feature amount calculating unit 108 calculates the feature amount v(X) of the image data X by aligning all scores $s_j$ in one line as shown in FIG. 2 and Expression (2).

$$v(X) = (s_1, s_2, \ldots, s_O) \qquad (2)$$

For example, it is assumed that the classifiers $F_j(x)$ are functions that discriminate two-classes and output 0 or 1 as the scores $s_j$. In this case, the feature amount calculating unit 108 calculates the feature amount of the image data X received by the input receiving unit 104 as a vector expressed by a combination of 0 and 1 like v(X)=(1, 1, 0, 1, 0, . . . , 1), for example. Moreover, although the feature amount calculating unit 108 calculates the feature amount of image data X' (X'≠X) received by the input receiving unit 104 as a vector expressed also by a combination of 0 and 1 like v(X')=(0, 1, 1, 1, 0, . . . , 0), of which calculated feature amount is different from the feature amount of the image data X. That is, in this example, the vector expressed by a combination of 0 and 1 becomes the feature amount unique to an object included in the image data X and becomes the feature amount effective to recognition of objects. The same can be applied to a case where the classifiers $F_j(x)$ are functions that discriminate two or more classes and output real numbers other than 0 and 1 as the scores $s_j$.

However, the method of calculating the feature amount is not limited to the method described above, and the feature amount may be calculated by using the acquired scores $s_j$ in any optional manner.

In addition, when the scores $s_j$ are vectors, the feature amount v(X) of the image data X becomes one in which the respective elements of the scores $s_j$ are aligned. That is, if the dimensionalities of the scores $s_j$ are $d_j$, the dimensionality D of the feature amount v(X) of the image data X becomes the sum of the dimensionalities $d_j$ ($D = d_1 + \ldots + d_O$). In addition, the dimensionalities $d_j$ of the respective scores $s_j$ may be the same values and may be different values.

Moreover, the feature amount calculating unit 108 may calculate the feature amount v(X) as a histogram of the scores $s_j$. Specifically, the feature amount calculating unit 108 can calculate a histogram feature amount v(X) by discretizing (if necessary, for each element) the scores $s_j$ and voting for a bin corresponding to the discretized value.

When the scores $s_j$ are vectors, the feature amount calculating unit 108 can calculate the histogram feature amount v(X) by using a histogram of the dimensionality of $d_j$. Moreover, when there are scores $s_j$ which are combinations of scalar quantities and vectors having different dimensionalities, the feature amount calculating unit 108 can calculate the histogram feature amount v(X) by calculating the histogram feature amount of each of the scores $s_j$ of the same kinds and aligning the calculated histogram feature amounts as one vector.

Moreover, the feature amount calculating unit 108 may align (connect) the feature amount vector obtained by aligning the scores $s_j$ in one line and the histogram feature amounts obtained by histogramming the scores $s_j$ as one vector to thereby calculate the feature amounts v(X). Moreover, the feature amount calculating unit 108 may apply nonlinear transformation to the scores $s_j$ to thereby calculate the feature amounts. Furthermore, the feature amount calculating unit 108 may perform normalization on the calculated feature amounts so that the average becomes 0 or the root mean square becomes 1.

The recognition table storage unit 110 stores a recognition table in which categories are correlated with respective standard feature amounts serving as recognition metric. Here, categories represent the kinds of targets recognized, and if the targets are objects like in the present embodiment, the categories correspond to the name, weight, price, or the like of the object. When the object is the face of a person, the category corresponds to the name or department of the person, for example. However, the categories are not limited to these examples. The groups of standard feature amounts and categories are registered in the recognition table by the feature amount calculating unit 108. Specifically, the feature amount calculating unit 108 calculates the feature amounts of the patterns in which known targets are included using evaluation metric and registers the calculated feature amounts in the recognition table as standard feature amounts so as to be correlated with categories to which the known targets belong. The patterns, in which the known targets serving as the source of the standard feature amounts are included, correspond to evaluation samples described later.

FIG. 3 is a diagram illustrating an example of the recognition table. In the example shown in FIG. 3, a category A is correlated with a standard feature amount v'(A)=($a_1$, $a_2$, ..., $a_O$) serving as the recognition metric as to whether or not to belong to the category A, and a category B is correlated with a standard feature amount v'(B)=($b_1$, $b_2$, ..., $b_O$) serving as the recognition metric as to whether or not to belong to the category B.

The similarity calculating unit 112 calculates the similarities between the feature amounts calculated by the feature amount calculating unit 108 and the standard feature amounts stored in the recognition table storage unit 110. In the present embodiment, the similarity calculating unit 112 calculates the similarities between the feature amount v(X) calculated by the feature amount calculating unit 108 and the respective standard feature amounts (the standard feature amount v'(A), the standard feature amount v'(B), and the like) stored in the recognition table storage unit 110 using Expression (3).

$$L=(\alpha, \beta)/\|\alpha\|\|\beta\| \quad (3)$$

Here, Expression (3) is an expression that calculates the simple similarity between vectors $\alpha$ and $\beta$. ($\alpha$, $\beta$) represents the inner product of the vectors $\alpha$ and $\beta$, and $\|\alpha\|$ and $\|\beta\|$ each represent the norm of the vectors $\alpha$ and $\beta$. For example, the similarities L between the feature amount v(X) and the standard feature amount v'(A) become L=(v(X), v'(A))/$\|$v(X)$\|$$\|$v'(A)$\|$ by Expression (3).

In addition, the similarity calculating unit 112 may calculate the similarities between the feature amounts v(X) calculated by the feature amount calculating unit 108 and the respective standard feature amounts (the standard feature amount v'(A), the standard feature amount v'(B), and the like) stored in the recognition table storage unit 110 using Expression (4) or (5) that calculates an inter-vector distance.

$$\sum_{j=1}^{o} |\alpha_j - \beta_j| \quad (4)$$

$$\sqrt{\sum_{j=1}^{o} |\alpha_j - \beta_j|^2} \quad (5)$$

The recognition unit 114 recognizes targets included in a pattern using the similarities calculated by the similarity calculating unit 112. Specifically, the recognition unit 114 classifies unknown targets included in the pattern or specifies a plurality of candidates to which unknown targets belongs using the similarity calculated by the similarity calculating unit 112. In the present embodiment, the recognition unit 114 selects a predetermined number of standard feature amounts in the descending order of the values of the similarities L among the standard feature amounts of which the values of the similarities L calculated by the similarity calculating unit 112 exceed a threshold value, namely in the descending order of the similarity, from the recognition table stored in the recognition table storage unit 110. Moreover, the recognition unit 114 recognizes that the unknown objects included in the image data X belong to at least one of the categories corresponding to the predetermined number of selected standard feature amounts. Moreover, the recognition unit 114 may select a predetermined number of standard feature amounts in the descending order of the similarity among the similarities L calculated by the similarity calculating unit 112 from the recognition table stored in the recognition table storage unit 110.

Moreover, when the similarity calculating unit 112 calculates the similarities L using Expression (4) or (5) that calculates the inter-vector distance, the similarities increase as the inter-vector distance decreases, that is, the values of the similarities L decrease. In this case, the recognition unit 114 selects a predetermined number of standard feature amounts, in the ascending order of the values of the similarities L among the standard feature amounts of which the similarities L calculated by the similarity calculating unit 112 are smaller than a threshold value, from the recognition table stored in the recognition table storage unit 110. In addition, the recognition unit 114 may select a predetermined number of standard feature amounts in the ascending order of the values of the similarities L calculated by the similarity calculating unit 112 from the recognition table stored in the recognition table storage unit 110.

The output control unit 116 outputs the recognition results by the recognition unit 114 to the output unit 118. That is, the output control unit 116 outputs the classification results by the recognition unit 114, or the unknown targets included in the patterns and a plurality of candidates which are specified by the recognition unit 114 to belong to the unknown targets included in the patterns to the output unit 118. In the present embodiment, when categories, to which the unknown objects included in the image data X belong, are selected by the recognition unit 114, the output control unit 116 outputs the selected categories to the output unit 118. Moreover, when categories to which the unknown objects included in the image data X belong are not selected by the recognition unit 114, the output control unit 116 outputs a notice to the output unit 118 that the unknown objects included in the image data X do not belong to any category.

The output unit 118 is controlled by the output control unit 116 and outputs the recognition results by the recognition unit 114.

The learning sample storage unit 120 stores a plurality of learning samples in which respective learning samples are classified to any one of a plurality of categories. In the present embodiment, although a case in which the learning samples are the image data which are expressed by a vector of the dimensionality of Ds (Ds≥1 as described above), and in which respective vector elements are brightness values is described as an example, the learning samples are not limited to this. The learning samples may be voice samples or the like if they correspond to the patterns input by the input unit 102.

In the present embodiment, the learning sample storage unit 120 stores M (M≥2) image data. It is assumed that C (C≥2) categories are prepared for the image data, and M image data are classified into $M_h$ (1≤h≤C) image data for each category. That is, $M=M_1+ \ldots +M_C$.

The selecting unit 122 performs the process of selecting a plurality of groups each including one or more learning samples from the learning sample storage unit 120 several times. In particular, the selecting unit 122 selects the plurality of groups so that each of the plurality of selected groups includes approximately the same number of categories or samples of learning samples. Specifically, the selecting unit 122 selects the plurality of groups so that the difference between the groups in the number of categories or samples of learning samples included in each of the plurality of selected groups falls within a predetermined range. Moreover, in the present embodiment, it is assumed that the selecting unit 122 randomly selects (samples) the learning samples from the learning sample storage unit 120. By doing so, it can be expected that the categories of the learning samples included in the plurality of groups selected by the selecting unit 122 are different in each selection process of the selecting unit 122. However, the method of selecting the learning samples is not limited to this, but the learning samples may be selected by optional selection metric as long as it can be expected that the categories of the learning samples included in the plurality of selected groups are different in each selection process.

In the present embodiment, the selecting unit 122 performs N (N≥O) selection processes of randomly selecting K (K=2) groups from the learning sample storage unit 120 so that each group includes one or more image data. In particular, when performing the selection process, the selecting unit 122 randomly selects K groups so that each of the K groups includes the same number of categories of image data. The value of K may be 2 or more.

Therefore, rather than completely randomly selecting image data from the learning sample storage unit 120, the selecting unit 122 may apply weights in accordance with the number of image data in a category so as to decrease the difference in the number of image data between K groups and may extract a predetermined number of image data regardless of the number of image data in the category. When making the number of image data constant, the selecting unit 122 may randomly select image data from categories just simply and may preferentially select image data which has not been selected as learning samples from the categories.

The learning unit 124 learns a classification metric for classifying a plurality of groups for each of the plurality of groups selected by the selecting unit 122 to thereby obtain a classification metric group. In the present embodiment, the learning unit 124 learns a classifier $F_i(x)$ (1≤i≤N) for classifying the K groups for each of the K groups selected by the selecting unit 122 to thereby generate a group of classifiers $\{F_1(x), F_2(x), \ldots, F_N(x)\}$ which are N learned classifiers.

In the present embodiment, the learning unit 124 learns the classifier $F_i(x)$ for classifying K groups using a support vector machine. The support vector machine is a method of configuring a two-class pattern classifier. In this method, a separation plane on which the distance to the respective data is maximized is obtained from samples, and classifiers are learned based on metric that maximize a soft margin. However, the classifier learning technique is not limited to this, but a known learning technique may be used. For example, the learning unit 124 may use a learning technique such as boosting. Moreover, for example, when learning a classifier that classifies three groups selected by the selecting unit 122, the learning unit 124 may use a learning technique such as a k-nearest neighbor classifier, Bayes classification, or a neural network.

FIG. 4 is a diagram illustrating an example of a method of generating a classifier group. In the example shown in FIG. 4, it is assumed that $S_1$ to $S_M$(M>11) represent learning samples (image data), and C=M. That is, in the example shown in FIG. 4, it is assumed that all learning samples belong to different categories. Moreover, in the example shown in FIG. 4, it is assumed that K=2. That is, in the example shown in FIG. 4, the learning sample selecting unit 122 selects two groups so that 2 categories of learning samples are included in each group, that is, two learning samples are included in each group since C=M.

In the example shown in FIG. 4, the selecting unit 122 selects a group 151a which includes learning samples $S_1$ and $S_5$ and a group 151b which includes learning samples $S_2$ and $S_7$ in the first selection process. Moreover, the selecting unit 122 selects a group 152a which includes learning samples $S_3$ and $S_8$ and a group 152b which includes learning samples $S_{10}$ and $S_M$ in the second selection process. Furthermore, the selecting unit 122 selects a group 153a which includes learning samples $S_4$ and $S_9$ and a group 153b which includes learning samples $S_6$ and $S_7$ in the N-th selection process.

Moreover, the learning unit 124 learns a classifier $F_1(x)$ that classifies the groups 151a and 151b selected by the first selection process of the selecting unit 122. Moreover, the learning unit 124 learns a classifier $F_2(x)$ that classifies the groups 152a and 152b selected by the second selection process of the selecting unit 122. Moreover, the learning unit 124 learns a classifier $F_N(x)$ that classifies the groups 153a and 153b selected by the N-th selection process of the selecting unit 122. In this way, the learning unit 124 generates a classifier group $\{F_1(x), F_2(x), \ldots, F_N(x)\}$ including the N learned classifiers.

The classification metric group generated by the learning unit 124 is stored in the classification metric group storage unit 126. Specifically, the learning unit 124 stores the generated classifier group $\{F_1(x), F_2(x), \ldots, F_N(x)\}$ in the classification metric group storage unit 126.

The evaluation sample storage unit 128 stores a plurality of evaluation samples of which the respective evaluation samples are classified into any of a plurality of categories. In the present embodiment, similarly to the learning samples, although a case in which the evaluation samples are the image data which are expressed by a vector of the dimensionality of Ds (Ds≥1 as described above), and in which respective vector elements are brightness values is described as an example, the evaluation samples are not limited to this. The evaluation samples may be voice samples or the like similarly to the learning samples if they correspond to the patterns input by the input unit 102. However, it is assumed that the evaluation samples are patterns used for generation of the standard feature amounts registered in the recognition table and belong to categories correlated with the standard feature amounts.

Moreover, it is assumed that the distribution of the categories of the evaluation samples is different from the distribution of the categories of the learning samples (biased from the distribution of the categories of the learning samples). If the above conditions are met, the learning samples may be used as the evaluation samples.

In the present embodiment, the evaluation sample storage unit 128 stores M' (M'≥2) image data. It is assumed that C' (C'≥2) categories are prepared for the image data, and M' image data are classified into $M_g'$ (1≤g≤C') image data for each category. That is, $M'=M_1'+\ldots+M_{C'}'$.

The evaluating unit 130 acquires two or more evaluation samples of different categories from the evaluation sample storage unit 128, evaluates the classification metric included in the classification metric group using the acquired two or more evaluation samples, and acquires a plurality of classification metric corresponding to the evaluation results from the classification metric group to thereby generate an evaluation metric including the plurality of classification metric. In particular, the evaluating unit 130 evaluates a classification performance of the classification metric included in the classification metric group to classify evaluation samples of different categories using the acquired two or more evaluation samples to thereby acquire a plurality of classification metric corresponding to the evaluated classification performance.

Specifically, the evaluating unit 130 evaluates classification metric included in the classification metric group using the similarities between the evaluation samples of different categories. For example, the evaluating unit 130 applies the acquired two or more evaluation samples to a combination of acquired classification metric and each of non-acquired classification metric. Moreover, the evaluating unit 130 specifies the maximum value of the similarities between the evaluation samples of different categories for each combination and acquires the non-acquired classification metric included in a combination in which the specified maximum value is smallest. In addition, the evaluating unit 130 recursively acquires the classification metric.

In the present embodiment, it is assumed that the evaluating unit 130 performs O (O≥2 as described above) evaluation processes of evaluating the effectiveness of classifiers included in the classifier group $\{F_1(x), F_2(x), \ldots, F_N(x)\}$ stored in the classification metric group storage unit 126. That is, in the present embodiment, the evaluating unit 130 acquires O classifiers $F_i(x)$ from the classifier group $\{F_1(x), F_2(x), \ldots, F_N(x)\}$ and generates evaluation metric $\{F_1(x), F_2(x), \ldots, F_O(x)\}$ using the acquired O classifiers $F_i(x)$ as the classifiers $F_j(x)$. In addition, in the present embodiment, it is assumed that the evaluating unit 130 uses M' image data acquired from the evaluation sample storage unit 128 in the evaluation process.

Next, the evaluation process of the present embodiment will be described in detail.

First, in the first evaluation process, since there is no acquired classifier, the evaluating unit 130 applies M' image data acquired from the evaluation sample storage unit 128 to the respective classifiers $F_i(x)$ included in the classifier group $\{F_1(x), F_2(x), \ldots, F_N(x)\}$. In this way, the output values $t_1$ to $t_{M'}$ with respect to each of the M' image data are obtained for each classifier $F_i(x)$.

Next, the evaluating unit 130 calculates the similarities between the image data of different categories using the output values $t_1$ to $t_{M'}$ for each classifier $F_i(x)$. For example, it is assumed that image data of the output value $t_1$ belongs to the same category as the image data of the output values $t_2$ to $t_4$, and belongs to a category different from the image data of the output values $t_5$ to $t_r'$. In this case, the evaluating unit 130 calculates the similarities between the image data of the output value $t_1$ and the respective image data of the output values $t_5$ to $t_{M'}$ using the output values $t_1$ and $t_5$ to $t_{M'}$. The evaluating unit 130 calculates the similarities between the image data of the output values $t_2$ to $t_{M'}$ and the image data belonging to different categories by the same method. The similarities may be calculated by an optional method, and may be calculated using Expression (3), (4), or (5), for example.

Moreover, the evaluating unit 130 specifies the maximum value of the calculated similarities for each classifier $F_i(x)$ and acquires a classifier $F_i(x)$ in which the maximum value is smallest among the specified maximum values of the similarities.

Subsequently, in the second and subsequent evaluation processes, the evaluating unit 130 applies the M' image data acquired from the evaluation sample storage unit 128 to a combination of all acquired classifiers and each of non-acquired classifiers among the classifiers $F_i(x)$ included in the classifier group $\{F_1(x), F_2(x), \ldots, F_N(x)\}$. In this way, the output values $t_1$ to $t_{M'}$ with respect to each of the M' image data are obtained for each combination of classifiers.

For example, it is assumed that a classifier $F_3(x)$ is acquired in the first evaluation process. In this case, in the second evaluation process, the evaluating unit 130 applies M' image data to $\{F_3(x), F_1(x)\}, \{F_3(x), F_2(x)\}, \ldots, \{F_3(x), F_N(x)\}$ which is the combination of the classifier $F_3(x)$ which is all acquired classifier and each of the non-acquired classifiers $F_1(x), F_2(x)$, and $F_4(x)$ to $F_N(x)$. Moreover, for example, it is assumed that the classifier $F_3(x)$ is acquired in the first evaluation process, and the classifier $F_2(x)$ is acquired in the second evaluation process. In this case, in the third evaluation process, the evaluating unit 130 applies M' image data to $\{F_3(x), F_2(x), F_1(x)\}, \{F_3(x), F_2(x), F_4(x)\}, \ldots, \{F_3(x), F_2(x), F_N(x)\}$ which is the combination of the classifiers $F_3(x)$ and $F_2(x)$ which are all acquired classifiers and each of the non-acquired classifiers $F_1(x)$, and $F_4(x)$ to $F_N(x)$.

Subsequently, the evaluating unit 130 calculates the similarities between image data of different categories using the output values $t_1$ to $t_{M'}$ of the acquired image data for each combination of the classifiers. Moreover, the evaluating unit 130 specifies the maximum value of the calculated similarities for each combination of the classifiers and acquires the non-acquired classifiers $F_i(x)$ included in a combination of classifiers in which the maximum value is smallest among the specified maximum values of the similarities.

In the present embodiment, the evaluating unit 130 repeatedly performs the evaluation process O times to acquire O classifiers $F_i(x)$ and renumbers the acquired O classifiers $F_i(x)$ to classifiers $F_j(x)$ to thereby generate the evaluation metric $\{F_1(x), F_2(x), \ldots, F_O(x)\}$. For example, it is assumed that O classifiers $F_3(x), F_4(x), \ldots$, and $F_1(x)$ are acquired in that order by O evaluation processes. In this case, the evaluating unit 130 renumbers the classifier $F_3(x)$ to $F_1(x)$, the classifier $F_4(x)$ to $F_2(x)$, and the classifier $F_1(x)$ to $F_O(x)$ to thereby generate the evaluation metric $\{F_1(x), F_2(x), \ldots, F_O(x)\}$.

The storage unit 132 stores the learning samples received by the input receiving unit 104 in the learning sample storage unit 120 and stores the evaluation samples received by the input receiving unit 104 in the evaluation sample storage unit 128.

FIG. 5 is a flowchart illustrating an example of the flow of a recognition process performed by the learning device 100 of the first embodiment.

First, the input receiving unit 104 receives the input of image data including an unknown object of a recognition subject from the input unit 102 (step S100).

Subsequently, the feature amount calculating unit 108 calculates the feature amount of the image data received by the input receiving unit 104 using the evaluation metric {$F_1(x)$, $F_2(x), \ldots, F_O(x)$} stored in the evaluation metric storage unit 106 (step S102).

Subsequently, the similarity calculating unit 112 calculates the similarities between the feature amount calculated by the feature amount calculating unit 108 and the respective standard feature amounts stored in the recognition table storage unit 110 (step S104).

Subsequently, the recognition unit 114 selects standard feature amounts of which the similarities are on the higher rank among the standard feature amounts of which the values of the similarities calculated by the similarity calculating unit 112 exceed a threshold value from the recognition table stored in the recognition table storage unit 110, and recognizes that an unknown object included in the image data belongs to at least one of the categories corresponding to the selected standard feature amounts (step S106). When there is no standard feature amount of which the value of the similarity calculated by the similarity calculating unit 112 exceeds the threshold value, the recognition unit 114 recognizes that the unknown object included in the image data does not belong to any category.

Subsequently, the output control unit 116 outputs the recognition results by the recognition unit 114, namely the category of the unknown object recognized by the recognition unit 114, or a notice that the unknown object does not belong to any category, to the output unit 118 (step S108).

FIG. 6 is a flowchart illustrating an example of the flow of a learning process performed by the learning device 100 of the first embodiment.

First, the selecting unit 122 selects two groups each including one or more image data from the learning sample storage unit 120 (step S200). In this case, the selecting unit 122 selects the two groups so that the difference between the groups in the number of categories of the image data, included in each of the two groups, falls within a predetermined range.

Subsequently, the learning unit 124 learns a classifier that classifies the two groups selected by the selecting unit 122 (step S202).

Subsequently, when N selections have not been made, for example, the selecting unit 122 determines to continue selection (Yes in step S204), and the flow returns to step S200. When N selections have been made, the selecting unit 122 determines not to continue selection (No in step S204), and the flow proceeds to step S206.

Subsequently, the learning unit 124 stores the classifier group learned in step S202 in the classification metric group storage unit 126 (step S206).

FIG. 7 is a flowchart illustrating an example of the flow of an evaluation process performed by the learning device 100 of the first embodiment.

First, the evaluating unit 130 selects one non-selected classifier among the non-acquired classifiers from the classifier group stored in the classification metric group storage unit 126 (step S300).

Subsequently, the evaluating unit 130 applies two or more image data of different categories acquired from the evaluation sample storage unit 128 to a combination of all classifiers acquired from the classifier group stored in the classification metric group storage unit 126 and the selected non-acquired classifiers, and calculates the similarities between the image data of different categories (step S302). In the first evaluation process, since there is no acquired classifier, the evaluating unit 130 applies two or more image data of different categories to the selected non-acquired classifiers and calculates the similarities between image data of different categories.

Subsequently, the evaluating unit 130 specifies the maximum value of the calculated similarities (step S304).

Subsequently, when there is a combination of non-evaluated classifiers (Yes in step S306), namely when there is a non-selected and non-acquired classifier in the classifier group, the evaluating unit 130 returns to step S300. On the other hand, when there is no combination of non-evaluated classifiers (No in step S306), namely when there is no non-selected and non-acquired classifier in the classifier group, the evaluating unit 130 proceeds to step S308.

Subsequently, the evaluating unit 130 acquires non-acquired classifiers included in the combination of classifiers in which the maximum value of the similarities is smallest among the specified maximum values of the similarities for each combination of classifiers (step S308). In the first evaluation process, the evaluating unit 130 acquires a classifier in which the maximum value of the similarities is smallest among the maximum values of the similarities specified for each classifier.

Subsequently, when O evaluation processes have not been performed, for example, the evaluating unit 130 determines to continue the evaluation process (Yes in step S310) and returns to step S300. In this case, since a new classifier is acquired in step S308, all non-acquired classifiers are restored to non-selected classifiers, and the process is restarted. On the other hand, when O evaluation processes have been performed, the evaluating unit 130 determines not to continue the evaluation process (No in step S310) and proceeds to step S312.

Subsequently, the evaluating unit 130 generates an evaluation metric including all acquired classifiers and stores the evaluation metric in the evaluation metric storage unit 106 (step S312).

FIG. 8 is a flowchart illustrating an example of the flow of a learning sample storing process performed by the learning device 100 of the first embodiment. The learning sample storing process shown in FIG. 8 is performed during factory shipment of the learning device 100, for example.

First, the input receiving unit 104 receives the input of image data including a known object as learning samples from the input unit 102 (step S400).

Subsequently, the storage unit 132 stores the image data received as the learning samples by the input receiving unit 104 in the learning sample storage unit 120 (step S402).

FIG. 9 is a flowchart illustrating an example of the flow of an evaluation sample storing process performed by the learning device 100 of the first embodiment. The evaluation sample storing process shown in FIG. 9 is performed by a user after the shipment of the learning device 100, for example.

First, the input receiving unit 104 receives the input of image data including a known object as evaluation samples from the input unit 102 (step S500).

Subsequently, the storage unit 132 stores the image data received as the evaluation samples by the input receiving unit 104 in the evaluation sample storage unit 128 (step S502).

Figure 10:
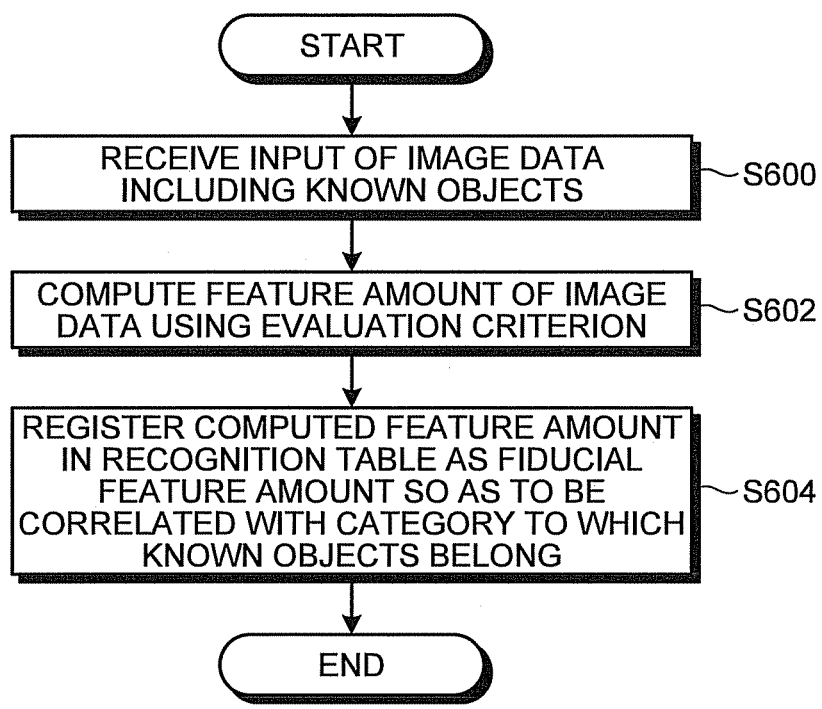
FIG. 10 is a flowchart illustrating an example of a standard feature amount registration process in the first embodiment.

FIG. 10 is a flowchart illustrating an example of the flow of a standard feature amount registration process performed by the learning device 100 of the first embodiment.

First, the input receiving unit 104 receives the input of image data including a known object from the input unit 102 (step S600). Here, the image data including the known object received by the input receiving unit 104 are the same image data as at least some of the image data stored in the evaluation sample storage unit 128.

Subsequently, the feature amount calculating unit 108 calculates the feature amounts of the image data received by the input receiving unit 104 using the evaluation metric {$F_1(x)$, $F_2(x)$, ..., $F_O(x)$} stored in the evaluation metric storage unit 106 (step S602).

Subsequently, the feature amount calculating unit 108 registers the calculated feature amounts in the recognition table as standard feature amounts so as to be correlated with categories to which the known objects included in the image data received by the input receiving unit 104 belong (step S604).

As above, the learning device 100 of the first embodiment learns, for each of a plurality of groups, classification metric that classify the plurality of groups, namely classification metric that classify the categories of the learning samples included in each group or the combination of categories between groups. Moreover, in the learning device 100 of the first embodiment, the selection of a plurality of groups, namely the selection of the categories of the learning samples included in each group or the selection of the combination of categories is automatically performed by the selecting unit 122. Therefore, according to the learning device 100 of the first embodiment, persons do not need to give classification metric, and it is possible to reduce the cost associated with learning of the classification metric. In contrast, in the method of the related art, persons need to give attributes serving as classification metric, which incurs a cost associated with learning of the classification metric.

Moreover, in the learning device 100 of the first embodiment, the number of combinations of groups, namely the number of combinations of categories of learning samples included in a group or the number of inter-group combinations of categories tends to be enormous. Therefore, according to the learning device 100 of the first embodiment, it is possible to learn a necessary number of classification metric without being limited to an upper-limit number to generate evaluation metric. In contrast, in the method of the related art, since the classification metric are limited to those metric which can be clearly determined by persons who give, such as, for example, gender, race, or age.

Moreover, in the learning device 100 of the first embodiment, the selecting unit 122 randomly selects a plurality of groups so that the difference between the groups in the number of categories or samples of learning samples included in each of the plurality of selected groups falls within a predetermined range. That is, in the learning device 100 of the first embodiment, each of a plurality of groups of classification subjects is randomly selected so as to have the same distribution. With the classification metric learned so as to classify the plurality of groups selected in this way, the score of patterns in which the targets of recognition subjects are included, namely the likelihood whether the patterns will be determined to belong to any of the plurality of groups used for the learning is completely random.

Therefore, for example, if the same classification metric are used for each of two patterns including targets, when the targets included in each of the two patterns are the same, it can be expected that the values of the scores are the same, namely both targets are similar to any of the plurality of groups of classification subjects. On the other hand, when the targets included in each of the two patterns are different, the values of the scores are indefinite, namely not correlated. Here, the fact that the scores of each of two patterns including different targets are not correlated means that the similarity becomes zero when normalized correlation or the like is used for calculating similarity in target recognition, for example.

That is, in the learning device 100 of the first embodiment, by randomly selecting a plurality of groups so that the difference between the groups in the number of categories or samples of learning samples, included in each of the plurality of selected groups, falls within a predetermined range, the classification metric for classifying the plurality of groups have features that transformation which separates the similarities of different targets is incorporated therein.

Therefore, according to the learning device 100 of the first embodiment, evaluation metric including classification metric effective for classifying targets included in patterns, namely preferable for recognition accuracy of target recognition can be learned from learning samples efficiently and quickly. In contrast, in the method of the related art, depending on an attribute (for example, a certain person and the other persons) serving as a classification metric, since learning samples are learned to be biased to one side (the other persons), a bias also appears in the distribution of the scores of the classification metric. Thus, the evaluation metric may not be effective for recognizing objects included in the image data.

However, even if the classification metric are learned by the above-described method, when there is a bias in the distribution of the recognition table (a combination of standard feature amounts and categories) used for target recognition, namely when the distribution of patterns used for generating standard feature amounts is biased with respect to the distribution of learning samples used for generating evaluation metric, it cannot be said that the values of scores are not correlated even when the targets included in each of two patterns are different. For example, when learning samples are prepared during factory shipment and the recognition table is prepared by a user after the factory shipment, the distribution of the recognition table may be biased with respect to the distribution of learning samples.

Therefore, in the learning device 100 of the first embodiment, the evaluation samples, which are patterns used for generating standard feature amounts, are applied to the classification metric learned by the learning unit 124, the classification metric are evaluated using the similarities between evaluation samples of different categories, and classification metric are acquired so that the distance between the evaluation samples is large to thereby generate evaluation metric. That is, in the learning device 100 of the first embodiment, the evaluation metric are generated by excluding classification metric which are not effective for classification, namely classification metric that cannot classify targets by the relation with standard feature amounts from the classification metric learned by the learning unit 124. Therefore, according to the learning device 100 of the first embodiment, even when there is a bias in the distribution of the recognition table (a combination of standard feature amounts and categories) used for target recognition, the values of the scores of two patterns including different targets can be made to be not correlated. Thus, it is possible to generate evaluation metric including classification metric preferable for target recognition.

Moreover, according to the learning device 100 of the first embodiment, since the evaluation metric are generated by excluding classification metric which are not effective for classification, it is possible to reduce the load for calculating the feature amounts using the evaluation metric and the memory size of the recognition table.

Second Embodiment

In the second embodiment, an example where classification metric are evaluated using intra-class dispersion and inter-class dispersion will be described. In the following description, the difference from the first embodiment will be described mainly, and constituent elements having the same functions as those of the first embodiment will be denoted by the same names and reference numerals as those of the first embodiment, and redundant description thereof will not be provided.

Figure 11:
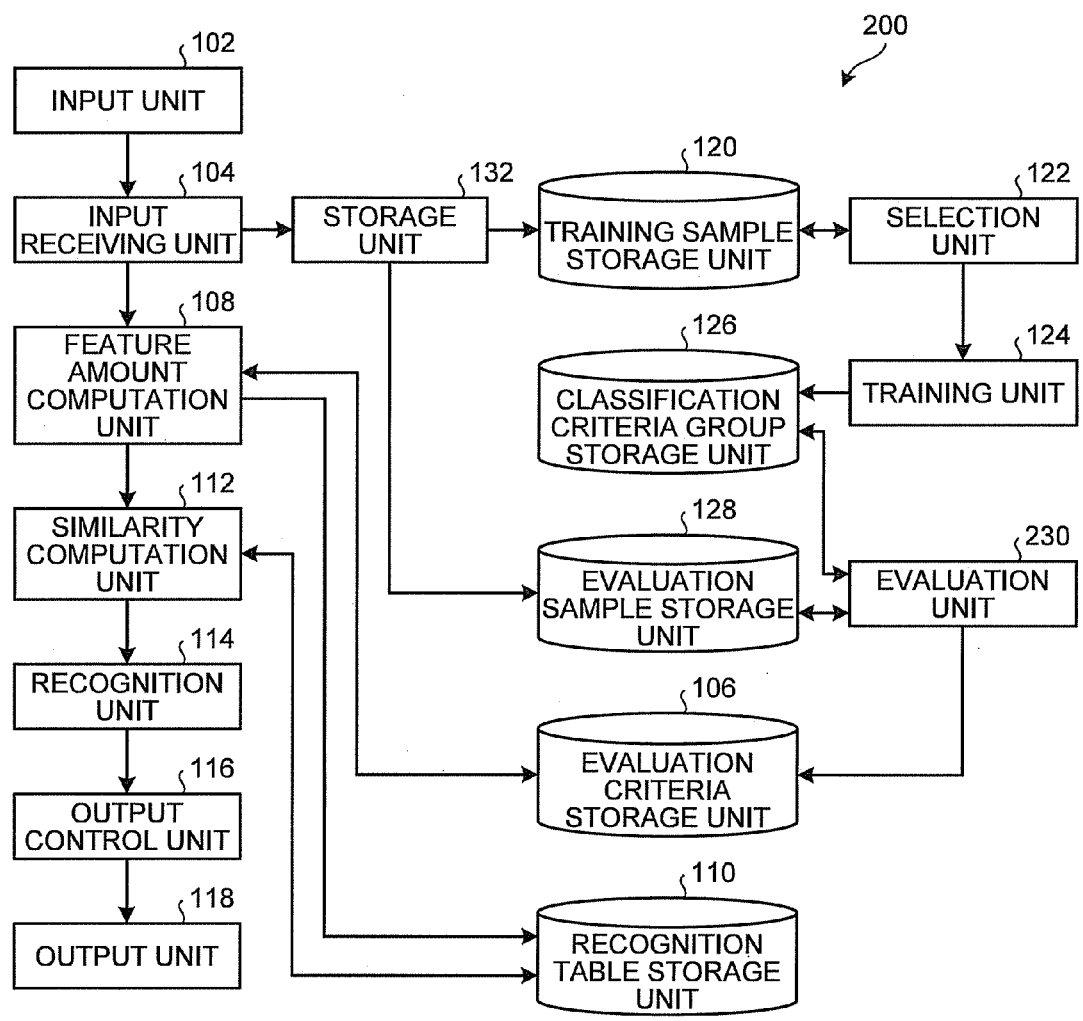
FIG. 11 is a block diagram illustrating a configuration example of a learning device according to a second embodiment.

FIG. 11 is a block diagram illustrating an example of the configuration of a learning device 200 according to the second embodiment. As shown in FIG. 11, in the learning device 200 of the second embodiment, an evaluating unit 230 is different from that of the learning device 100 of the first embodiment.

The evaluating unit 230 evaluates the classification metric included in the classification metric group using at least one of the intra-class dispersion and the inter-class dispersion of two or more acquired evaluation samples. Specifically, the evaluating unit 230 applies two or more acquired evaluation samples to the respective classification metric included in the classification metric group to calculate a value obtained by dividing the inter-class dispersion of the two or more evaluation samples by the intra-class dispersion for each classification metric and acquires a plurality of classification metric in the descending order of the calculated value. Moreover, the evaluating unit 230 recursively acquires the classification metric. In the following description, the value obtained by dividing the inter-class dispersion by the intra-class dispersion will be referred to as a separation value.

Here, the intra-class dispersion represents the closeness in the distance between the evaluation samples in the same category, and the distance between the evaluation samples in the same category decreases as the value decreases. The inter-class dispersion represents the closeness in the distance between the evaluation samples in different categories, and the distance between the evaluation samples in different categories increases as the value increases. Thus, a larger separation value means that intra-category separation and inter-category separation are favorable, and a classification metric having a larger separation value exhibits a high classification performance.

However, the evaluation method is not limited to this, but other methods may be used as long as they evaluate the classification metric included in the classification metric group using at least one of the intra-class dispersion and the inter-class dispersion of two or more acquired evaluation samples.

In the present embodiment, the evaluating unit 230 evaluates the effectiveness of the respective classifiers $F_i(x)$ included in the classifier group $\{F_1(x), F_2(x), \ldots, F_N x\}$ stored in the classification metric group storage unit 126 using M' image data acquired from the evaluation sample storage unit 128. Moreover, the evaluating unit 230 acquires O classifiers $F_i(x)$ in the descending order of the effectiveness and generates evaluation metric $\{F_1(x), F_2(x), \ldots, F_O(x)\}$ using the acquired O classifiers $F_i(x)$ as the classifiers $F_j(x)$.

Specifically, the evaluating unit 230 repeatedly performs the evaluation O times to thereby calculate the separation value of M' image data in the classifiers $F_i(x)$ using Expression (6) for each of the classifiers $F_i(x)$ included in the classifier group $\{F_1(x), F_2(x), \ldots, F_N(x)\}$. Moreover, the evaluating unit 230 acquires O classifiers $F_i(x)$ in the descending order of the separation value, and renumbers the acquired O classifiers $F_i(x)$ to classifiers $F_j(x)$, and thereby generates the evaluation metric $\{F_1(x), F_2(x), \ldots, F_O(x)\}$.

$$S(F) = S_B(F)/S_W(F) \tag{6}$$

Here, S(F) represents the separation value of M' image data in the classifier, $S_B(F)$ represents the inter-class dispersion of the M' image data in the classifier, and S(F) represents the intra-class dispersion of the M' image data in the classifier. The $S_B(F)$ can be obtained by Expression (7).

$$S_B(F) = \sum_{g=1}^{C'} M'_g(m_g(F) - m(F))(m_g(F) - m(F))^t \tag{7}$$

Here, C' represents the number of categories of the image data (evaluation samples) stored in the evaluation sample storage unit 128 as described above, and $M_g'$ represents the number of image data (the number of evaluation samples) belonging to the g category as described above. t represents transposition. $m_g$ can be obtained by Expression (8), and m can be obtained by Expression (9).

$$m_g = \frac{1}{M'_g} \sum_{k=1}^{M'_g} F(x_{gk}) \tag{8}$$

Here, $x_{gk}$ represents the k-th ($1 \leq k \leq M_g'$) image data (evaluation sample) belonging to the g category.

$$m = \frac{1}{M'} \sum_{g=1}^{C'} M'_g F(m_g) \tag{9}$$

Returning to Expression (6), the S(F) can be obtained by Expression (10).

$$S_w(F) = \sum_{g=1}^{C'} S_g(F) \tag{10}$$

$S_g(F)$ can be obtained by Expression (11).

$$S_g(F) = \sum_{k=1}^{M'_g} (F(x_{gk}) - m_g(F))(F(x_{gk}) - m_g(F))^t \tag{11}$$

Figure 12:
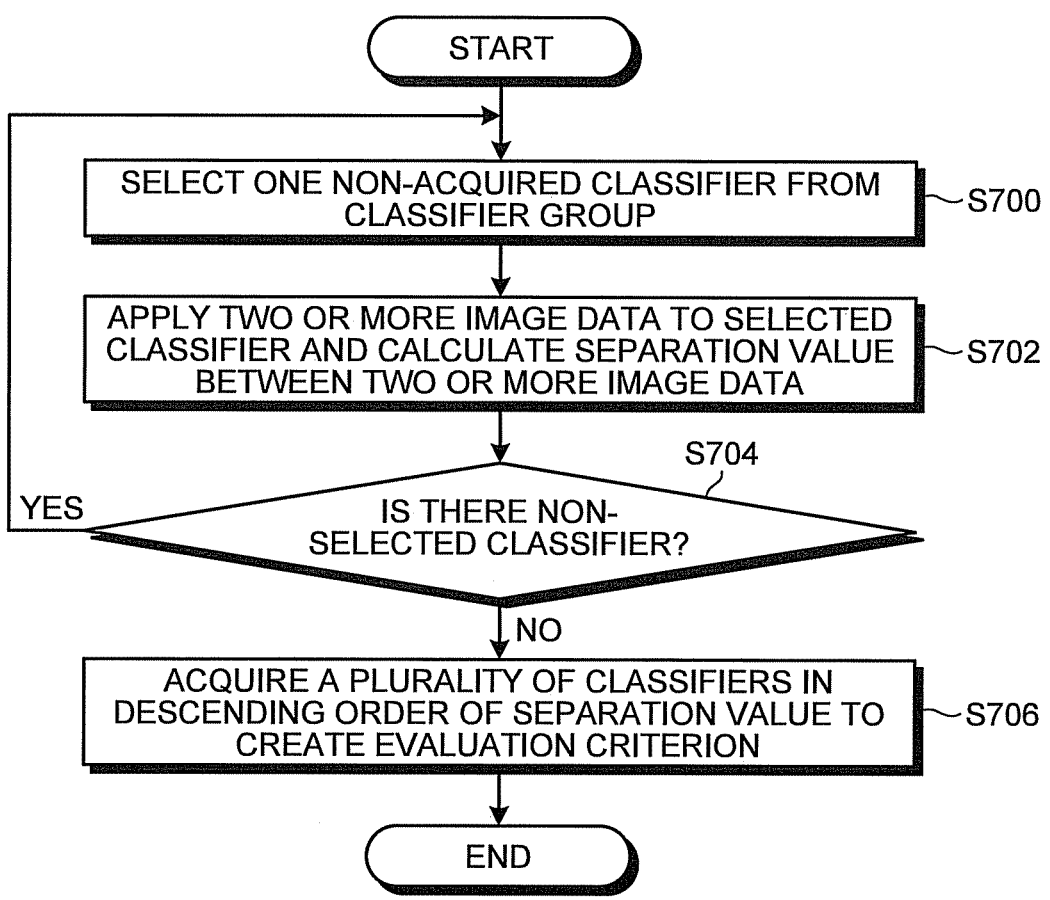
FIG. 12 is a flowchart illustrating an example of an evaluation process in the learning device of the second embodiment.

FIG. 12 is a flowchart illustrating an example of the flow of an evaluation process performed by the learning device 200 of the second embodiment.

First, the evaluating unit 230 selects one non-selected classifier from the classifier group stored in the classification metric group storage unit 126 (step S700).

Subsequently, the evaluating unit 230 applies two or more image data of different categories acquired from the evaluation sample storage unit 128 to the selected classifier, and calculates the separation value of the two or more image data in the selected classifier (step S702).

Subsequently, the evaluating unit 230 returns to step S700 when there is a non-selected classifier in the classifier group (Yes in step S704). The evaluating unit 230 proceeds to step S706 when there is no non-selected classifier in the classifier (No in step S704).

Subsequently, the evaluating unit 230 acquired a plurality of, for example, O classifiers in the descending order of the calculated separation value to generate evaluation metric and stores the evaluation metric in the evaluation metric storage unit 106 (step S706).

As above, in the learning device 200 of the second embodiment, the evaluation samples, which are patterns used for generating standard feature amounts, are applied to the classification metric learned by the learning unit 124, the classification metric are evaluated using the separation value (value obtained by dividing the inter-class dispersion of the evaluation samples by the intra-class dispersion) of the evaluation samples, and classification metric are acquired so that the distance between the evaluation samples is large to thereby generate evaluation metric. Therefore, according to the learning device 200 of the second embodiment, even when there is a bias in the distribution of the recognition table (a combination of standard feature amounts and categories) used for target recognition, the values of the scores of two patterns including different targets can be made to be not correlated. Thus, it is possible to generate evaluation metric including classification metric preferable for target recognition. Moreover, since the evaluation metric are generated by excluding classification metric which are not effective for classification, it is possible to reduce the load for calculating the feature amounts using the evaluation metric and the memory size of the recognition table.

Third Embodiment

In the third embodiment, an example where classification metric are evaluated using a soft margin will be described. In the following description, the difference from the first embodiment will be described mainly, and constituent elements having the same functions as those of the first embodiment will be denoted by the same names and reference numerals as those of the first embodiment, and redundant description thereof will not be provided.

Figure 13:
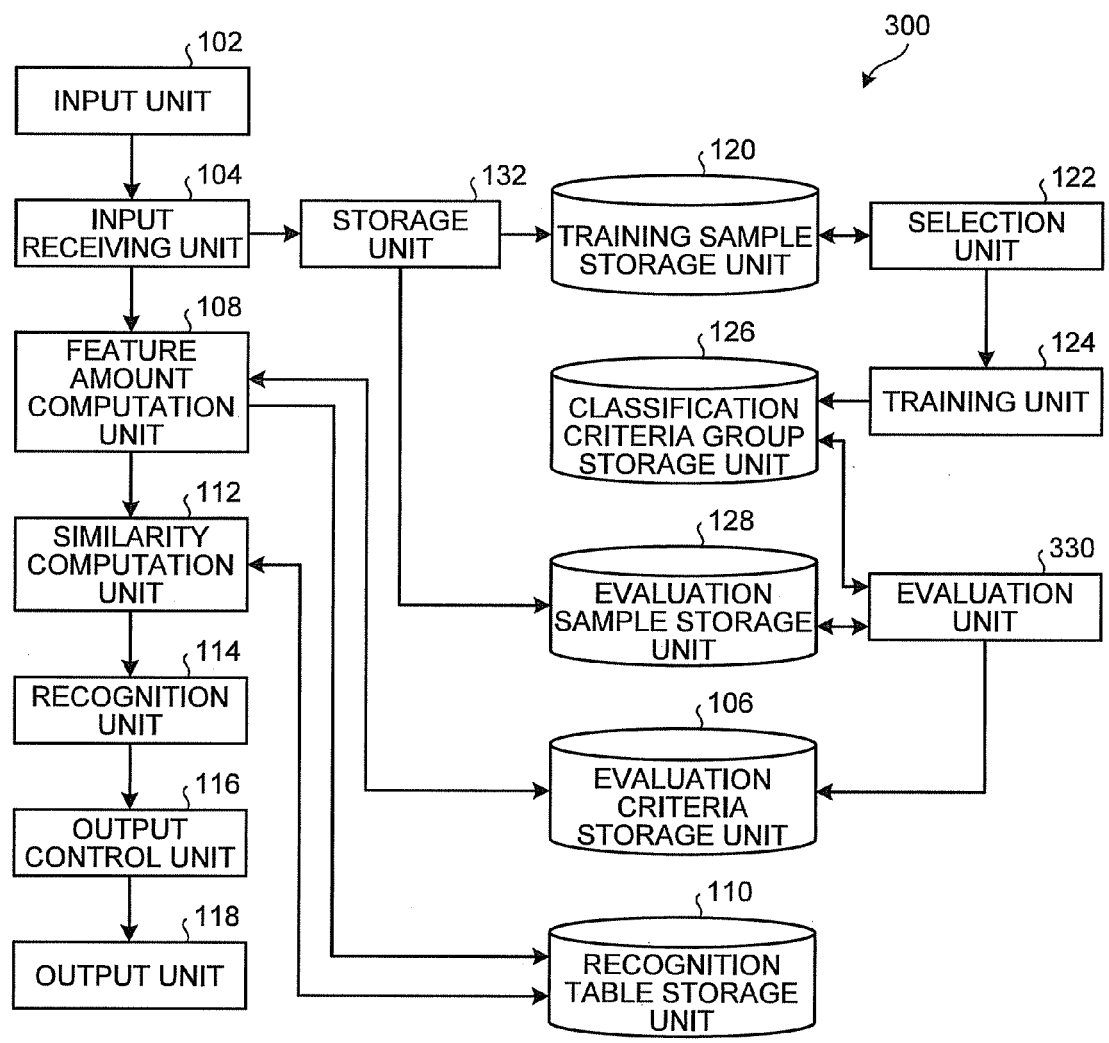
FIG. 13 is a block diagram illustrating a configuration example of a learning device according to a third embodiment.

FIG. 13 is a block diagram illustrating an example of the configuration of a learning device 300 according to the third embodiment. As shown in FIG. 13, in the learning device 300 of the third embodiment, an evaluating unit 330 is different from that of the learning device 100 of the first embodiment.

Similarly to the first embodiment, the learning unit 124 learns classification metric using a support vector machine.

The evaluating unit 330 evaluates classification metric included in the classification metric group using a soft margin between evaluation samples of different categories. Specifically, the evaluating unit 330 applies two or more acquired evaluation samples to a combination of acquired classification metric and each of non-acquired classification metric. Moreover, the evaluating unit 330 specifies the maximum value of the soft margins for each combination and acquires the non-acquired classification metric included in a combination in which the specified maximum value is smallest. In addition, the evaluating unit 330 recursively acquires the classification metric.

In the present embodiment, the evaluating unit 330 performs O evaluation processes of evaluating the effectiveness of classifiers using the M' image data acquired from the evaluation sample storage unit 128. Moreover, the evaluating unit 330 acquires O classifiers $F_i(x)$ from the classifier group $\{F_1(x), F_2(x), \ldots, F_N(x)\}$ and generates evaluation metric $\{F_1(x), F_2(x), \ldots, F_O(x)\}$ using the acquired O classifiers $F_i(x)$ as the classifiers $F_j(x)$.

Hereinafter, the evaluation process of the present embodiment will be described in detail.

First, before performing the evaluation process, the evaluating unit 330 classifies the C' (C'≥2 as above) categories of the M' image data acquired from the evaluation sample storage unit 128 into two-classes of the positive class and negative class for each of the classifiers $F_i(x)$ included in the classifier group $\{F_1(x), F_2(x), \ldots, F_N(x)\}$. Specifically, the evaluating unit 330 applies the $M_g'$ image data belonging to the g category to the classifiers $F_i(x)$ for each of the g (1≤g≤C' as above) categories of the M' image data, and compares the number of image data in which the output values of the classifiers $F_i(x)$ have a positive value and the number of image data in which the output values have a negative value. Moreover, the evaluating unit 330 determines the g category to be the positive class if there are more image data having the positive value and determines the g category to be the negative class if there are more image data having the negative value.

In the present embodiment, the soft margin of the image data belonging to the positive-class category is determined such that it takes 0 if the output value of the classifier $F_i(x)$ is 0 or more and it takes the absolute value of the output value if the output value has a negative value. Moreover, the soft margin of the image data belonging to the negative-class category is determined such that it takes 0 if the output value of the classifier $F_i(x)$ is 0 or smaller and it takes the absolute value of the output value if the output value has a positive value.

Subsequently, in the first evaluation process, since there is no acquired classifier, the evaluating unit 330 applies M' image data acquired from the evaluation sample storage unit 128 to the respective classifiers $F_i(x)$ included in the classifier group $\{F_1(x), F_2(x), \ldots, F_N(x)\}$. In this way, the soft margins with respect to each of the M' image data are obtained for each classifier $F_i(x)$.

Moreover, the evaluating unit 330 specifies the maximum value of the obtained soft margins for each classifier $F_i(x)$ and acquires a classifier $F_i(x)$ in which the maximum value is smallest among the specified maximum values of the soft margins.

Subsequently, in the second and subsequent evaluation processes, the evaluating unit 330 applies the M' image data acquired from the evaluation sample storage unit 128 to a combination of all acquired classifiers and each of non-acquired classifiers among the classifiers $F_i(x)$ included in the classifier group $\{F_1(x), F_2(x), \ldots, F_N(x)\}$. In this way, the soft margins with respect to each of the M' image data are obtained for each combination of classifiers. Here, it is assumed that the soft margin of the image data in the combination of classifiers is to be decided as the sum of the soft margins of the image data of the respective classifiers included in the combination of classifiers. For example, the soft margin of the image data in the combination of $\{F_3(x), F_1(x)\}$ becomes the sum of the soft margin of the image data in the classifier $F_3(x)$ and the soft margin of the image data in the classifier $F_1(x)$. Moreover, the evaluating unit 330 specifies the maximum value of the obtained soft margins for each combination of classifiers, and acquires a non-acquired classifier $F_i(x)$ included in the combination of classifiers in which the maximum value is smallest among the specified maximum values of the soft margins.

In the present embodiment, the evaluating unit 330 repeatedly performs the evaluation process O times to acquire O classifiers $F_i(x)$ and renumbers the acquired O classifiers $F_i(x)$ to classifiers $F_j(x)$ to thereby generate the evaluation metric $\{F_1(x), F_2(x), \ldots, F_O(x)\}$.

In addition, rather than specifying the maximum value of the obtained soft margins for each combination (classifier) of the classifiers, the evaluating unit 330 may specify the sum of the obtained soft margins for each combination (classifier) of the classifiers, and acquires a non-acquired classifier $F_i(x)$ included in the combination of classifiers in which the sum is smallest among the specified sums of the soft margins.

Figure 14:
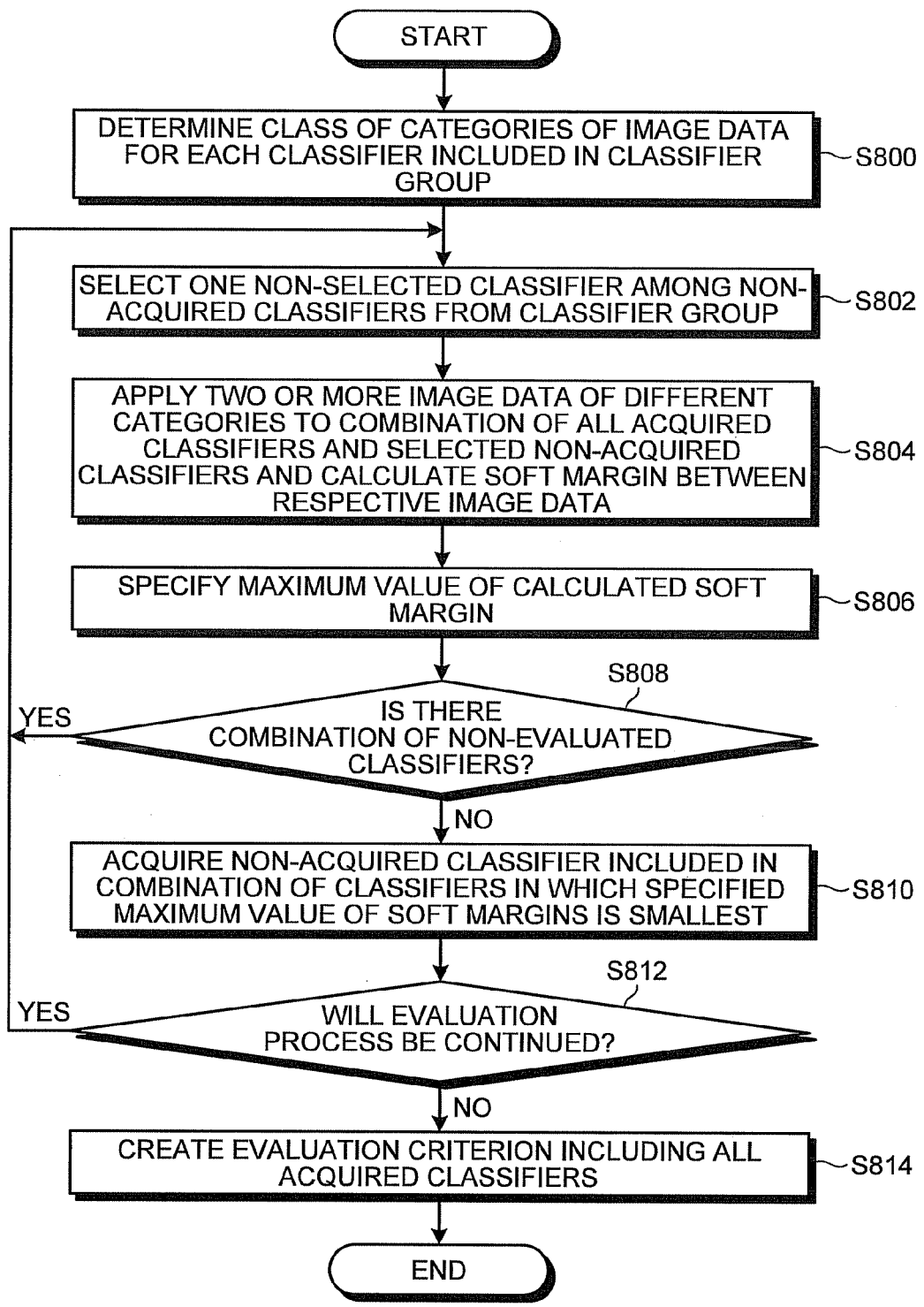
FIG. 14 is a flowchart illustrating an example of an evaluation process in the learning device of the third embodiment.

FIG. 14 is a flowchart illustrating an example of the flow of an evaluation process performed by the learning device 300 of the third embodiment.

First, the evaluating unit 330 determines the class of the category of the image data stored in the evaluation sample storage unit 128 for each of the classifiers included in the classifier group stored in the classification metric group storage unit 126 (step S800).

Subsequently, the evaluating unit 330 selects one non-selected classifier among the non-acquired classifiers from the classifier group stored in the classification metric group storage unit 126 (step S802).

Subsequently, the evaluating unit 330 applies two or more image data of different categories acquired from the evaluation sample storage unit 128 to a combination of all classifiers acquired from the classifier group stored in the classification metric group storage unit 126 and the selected non-acquired classifiers, and calculates the soft margins of the respective image data (step S804). In the first evaluation process, since there is no acquired classifier, the evaluating unit 330 applies two or more image data of different categories to the selected non-acquired classifiers, and calculates the soft margins of the respective image data.

Subsequently, the evaluating unit 330 specifies the maximum value of the calculated soft margins (step S806).

Subsequently, when there is a combination of non-evaluated classifiers (Yes in step S808), namely when there is a non-selected and non-acquired classifier in the classifier group, the evaluating unit 330 returns to step S802. On the other hand, when there is no combination of non-evaluated classifiers (No in step S808), namely when there is no non-selected and non-acquired classifier in the classifier group, the evaluating unit 330 proceeds to step S810.

Subsequently, the evaluating unit 330 acquires non-acquired classifiers included in the combination of classifiers in which the maximum value of the soft margins is smallest among the specified maximum values of the soft margins for each combination of classifiers (step S810). In the first evaluation process, the evaluating unit 330 acquires a classifier in which the maximum value of the soft margins is smallest among the maximum values of the soft margins specified for each classifier.

Subsequently, when O evaluation processes have not been performed, for example, the evaluating unit 330 determines to continue the evaluation process (Yes in step S812) and returns to step S802. In this case, since a new classifier is acquired in step S810, all non-acquired classifiers are restored to non-selected classifiers, and the process is restarted. On the other hand, when O evaluation processes have been performed, the evaluating unit 330 determines not to continue the evaluation process (No in step S812) and proceeds to step S814.

Subsequently, the evaluating unit 330 generates an evaluation metric including all acquired classifiers and stores the evaluation metric in the evaluation metric storage unit 106 (step S814).

As above, in the learning device 300 of the third embodiment, the evaluation samples which are patterns used for generating standard feature amounts are applied to the classification metric learned by the learning unit 124, the classification metric are evaluated using the soft margin, and classification metric are acquired so that the distance between the evaluation samples is large to thereby generate evaluation metric. Therefore, according to the learning device 300 of the third embodiment, even when there is a bias in the distribution of the recognition table (a combination of standard feature amounts and categories) used for target recognition, the values of the scores of two patterns including different targets can be made to be not correlated. Thus, it is possible to generate evaluation metric including classification metric preferable for target recognition. Moreover, since the evaluation metric are generated by excluding classification metric which are not effective for classification, it is possible to reduce the load for calculating the feature amounts using the evaluation metric and the memory size of the recognition table.

Modified Example

In the first and third embodiments, the evaluating unit may acquire a predetermined classifier among the classifier group $\{F_1(x), F_2(x), \ldots, F_N(x)\}$ as the first classifier in the first evaluation process. Moreover, the evaluating unit may randomly acquire the first classifier acquired in the first evaluation process from among the classifier group $\{F_1(x), F_2(x), \ldots, F_N(x)\}$. Moreover, when acquiring the predetermined classifier or randomly acquiring the classifier in the first evaluation process, the evaluating unit may generate a plurality of evaluation metric and use a evaluation metric in which the maximum value of the similarities between the evaluation samples of the most distant (separated) categories is smallest among the plurality of generated evaluation metric as an evaluation metric.

Moreover, in the first and third embodiments, whenever performing the evaluation process, the evaluating unit may apply the evaluation samples to all combinations of acquired classifiers to calculate the accuracy rate of the combination, and may use a combination in which the calculated accuracy rate is highest as an evaluation metric. In this case, the evaluating unit may perform the evaluation process N times. Moreover, since the accuracy rate is expected to increase as the number of evaluation processes performed increases to a certain extent and then decreases, the evaluating unit may terminate the evaluation process when it is possible to determine the combination having the highest accuracy rate. Moreover, the accuracy rate may be calculated at once after all classifiers are acquired. For example, the evaluating unit performs feature extraction using all combinations of acquired classifiers with respect to all evaluation samples, calculates the total number of most similar evaluation samples and evaluation samples of the same category using the extracted features, and divides the calculated total number of evaluation samples by the number of all evaluation samples to thereby calculate the accuracy rate. When the accuracy rate is used, the number (the number of evaluation processes performed) of classifiers included in the evaluation metric does not always come to be O, since the number depends on the accuracy rate.

Moreover, the first to third embodiments may be appropriately combined with each other. For example, the classifiers may be evaluated using a result obtained by applying the soft margins between evaluation samples of different categories to image data in which the maximum value of the similarities is smallest.

Moreover, in the respective embodiments described above, when the output of the classifier takes 3 states (for example, 0, 1, or 2), the classifiers may be evaluated using the number of evaluation samples belonging to the same category, having the same or different output values; and the number of evaluation samples belonging to different categories, having the same or different output values, and the like.

Moreover, in the respective embodiments, although an example in which the feature amounts are calculated by applying the evaluation metric to the image data has been described, the feature amounts may be calculated by extracting image features of the image data and by applying the extracted image features to the evaluation metric. In this case, the learning samples and evaluation samples may be the image features of the image data.

Moreover, in the respective embodiments, although an example, in which the evaluation samples are patterns used for generating the standard feature amounts registered in the recognition table, has been described, the evaluation samples may be different from the patterns as long as they have the same distribution as the patterns used for generating the standard feature amounts. For example, when a number of patterns of respective categories are prepared for generation of the standard feature amounts, part of the patterns may be used for generation of the standard feature amounts, and the other part may be used as the evaluation samples. In this case, the patterns used for generating the standard feature amounts can be considered to have the same distribution as the evaluation samples. Specifically, images, captured under the same environment as the patterns used for generating the standard feature amounts, may be used as the evaluation samples.

Hardware Configuration

Figure 15:
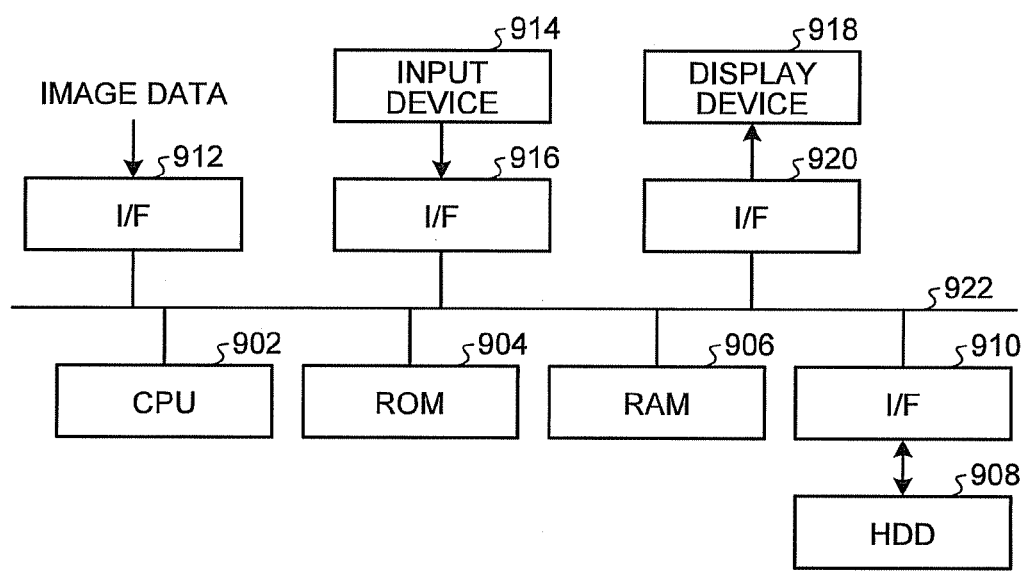
FIG. 15 is a block diagram illustrating an example of a hardware configuration of the learning device according to the first to third embodiments.

FIG. 15 is a block diagram illustrating an example of a hardware configuration of the learning device according to the first to third embodiments. As shown in FIG. 15, the learning device of the respective embodiments has a hardware configuration which uses a general computer, which includes a CPU 902, a ROM 904 that stores a learning program (a recognition program) or the like for generating evaluation metric and recognizing unknown targets included in image data, a RAM 906, a HDD 908 that stores learning samples, evaluation samples, evaluation metric, and recognition tables, an I/F 910 which is an interface to the HDD 908, an I/F 912 which is an image data input interface, an input device 914 such as a mouse or a keyboard, an I/F 916 which is an interface to the input device 914, a display device 918 such as a display, an I/F 920 which is an interface to the display device 918, and a bus 922. The CPU 902, the ROM 904, the RAM 906, and the I/Fs 910, 912, 916, and 920 are connected to each other through the bus 922.

In the learning device of the respective embodiments, the CPU 902 reads the learning program from the ROM 904 onto the RAM 906 and executes the learning program, whereby the respective units (the input receiving unit, the feature amount calculating unit, the similarity calculating unit, the recognition unit, the output control unit, the selecting unit, the learning unit, the evaluating unit, and the storage unit) are realized on a computer. Moreover, in the learning device of the respective embodiments, the CPU 902 generates evaluation metric using the learning samples, the evaluation samples, and the like stored in the HDD 908 and stores the evaluation metric in the HDD 908, and recognizes unknown objects included in the image data input from the I/F 912 using the evaluation metric, the recognition table, and the like stored in the HDD 908.

The learning program may be stored in the HDD 908. Moreover, the learning program may be stored in a computer-readable storage medium such as CD-ROM, CD-R, a memory card, a DVD, or a flexible disk (FD) as files having an installable format or an executable format and provided as a computer program product. Moreover, the learning program may be stored on a computer connected to a network such as the Internet and provided by being downloaded through the network. Furthermore, the learning program may be provided or distributed through a network such as the Internet. Furthermore, image data including unknown objects may be stored in the HDD 908 so that the image data are input from the I/F 910.

As described above, according to the respective embodiments and the respective modified examples, it is possible to reduce the cost associated with learning of classification metric and to obtain classification metric preferable for recognition. In the related art, although there is a possibility that a recognition performance is decreased due to at least one of the plurality of learned classification metric, according to the present embodiment and the respective modified examples, it is possible to obtain classification metric preferable for recognition.

For example, the execution order of the respective steps of the flowchart of the respective embodiments may be changed unless contrary to the nature thereof, a plurality of steps may be performed at the same time, or the steps may be performed in different orders in each execution.

Moreover, for example, in the embodiments, although an example in which the learning device performs both the learning process and the recognition process has been described, the learning process and the recognition process may be performed by different devices. For example, the learning process and the recognition process may be performed by a learning device and a recognition device, respectively. In this case, the evaluation metric generated by the learning device may be stored in the recognition device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirits of the inventions.

What is claimed is:

1. A learning device comprising:
   a processor;
   a selecting unit configured to perform a plurality of selection processes of selecting a plurality of groups including one or more learning samples from a learning sample storage unit that stores a plurality of learning samples in which respective learning samples are classified into any one of a plurality of categories;
   a learning unit configured to learn a classification metric that classifies the plurality of groups for each of the plurality of selected groups and obtains a set of a classification metric; and
   an evaluating unit configured to
      acquire two or more evaluation samples of different categories from an evaluation sample storage unit that stores a plurality of evaluation samples in which respective evaluation samples are classified into any one of a plurality of categories,
      evaluate the classification metric included in the set of the classification metric using the two or more acquired evaluation samples,
      acquire a plurality of classification metric corresponding to the evaluation results from the set of the classification metric, and thereby
      generate an evaluation metric including the plurality of classification metric.

2. The device according to claim 1,
   wherein distribution of categories of the evaluation samples is different from distribution of categories of the learning samples, and
   wherein the evaluating unit
      evaluates a classification performance of the classification metric included in the set of the classification metric to classify evaluation samples of different categories using the two or more evaluation samples, and thereby acquires a plurality of classification metric corresponding to the evaluated classification performance.

3. The device according to claim 1, further comprising:
an input receiving unit configured to receive input of patterns including targets;
a feature amount calculating unit configured to calculate a feature amount of the patterns using the evaluation metric;
a similarity calculating unit configured to calculate a similarity between the feature amount and a standard feature amount serving as a recognition metric of the targets;
a recognition unit configured to recognize the targets using the similarity; and
an output control unit configured to cause an output unit to output the recognition results,
wherein the standard feature amount is a feature amount of the evaluation sample calculated using the evaluation metric.

4. The device according to claim 1,
wherein the evaluating unit evaluates classification metric included in the set of the classification metric using the similarity between evaluation samples of different categories.

5. The device according to claim 4,
wherein the evaluating unit
applies the two or more evaluation samples to a combination of an acquired classification metric and each of non-acquired classification metric,
specifies the maximum value of the similarities between the evaluation samples of different categories for each combination, and
acquires a non-acquired classification metric included in a combination in which the maximum value is smallest.

6. The device according to claim 1,
wherein the evaluating unit evaluates classification metric included in the set of the classification metric, by using at least one of an intra-class dispersion and an inter-class dispersion of the two or more evaluation samples.

7. The device according to claim 6,
wherein the evaluating unit
applies the two or more evaluation samples to respective classification metric included in the set of the classification metric,
calculates a value obtained by dividing the inter-class dispersion of the two or more evaluation samples by the intra-class dispersion for each classification metric, and
acquires a plurality of classification metric in the descending order of the calculated value.

8. The device according to claim 1,
wherein the learning unit learns the classification metric using a support vector machine, and
wherein the evaluating unit evaluates classification metric included in the set of the classification metric using a soft margin between evaluation samples of different categories.

9. The device according to claim 8,
wherein the evaluating unit applies the two or more evaluation samples to a combination of an acquired classification metric and each of non-acquired classification metric,
specifies the maximum value of soft margins for each combination, and
acquires a non-acquired classification metric included in a combination in which the specified maximum value is smallest.

10. The device according to claim 4,
wherein the evaluating unit recursively acquires classification metric.

11. A learning method comprising:
performing a plurality of selection processes of selecting a plurality of groups including one or more learning samples from a learning sample storage unit that stores a plurality of learning samples in which respective learning samples are classified into any one of a plurality of categories;
learning a classification metric that classifies the plurality of groups for each of the plurality of selected groups and obtaining a set of a classification metric; and
evaluating that includes
acquiring two or more evaluation samples of different categories from an evaluation sample storage unit that stores a plurality of evaluation samples in which respective evaluation samples are classified into any one of a plurality of categories,
evaluating the classification metric included in the set of the classification metric using the two or more acquired evaluation samples,
acquiring a plurality of classification metric corresponding to the evaluation results from the set of the classification metric, and
generating an evaluation metric including the plurality of classification metric.

12. A computer program product comprising a non-transitory computer readable medium including programmed instructions, wherein the instructions, when executed by a computer, cause the computer to perform:
performing a plurality of selection processes of selecting a plurality of groups including one or more learning samples from a learning sample storage unit that stores a plurality of learning samples in which respective learning samples are classified into any one of a plurality of categories;
learning a classification metric that classifies the plurality of groups for each of the plurality of selected groups and obtaining a set of a classification metric; and
evaluating that includes
acquiring two or more evaluation samples of different categories from an evaluation sample storage unit that stores a plurality of evaluation samples in which respective evaluation samples are classified into any one of a plurality of categories,
evaluating the classification metric included in the set of the classification metric using the two or more acquired evaluation samples,
acquiring a plurality of classification metric corresponding to the evaluation results from the set of the classification metric, and
generating an evaluation metric including the plurality of classification metric.

* * * * *